Patented July 11, 1933

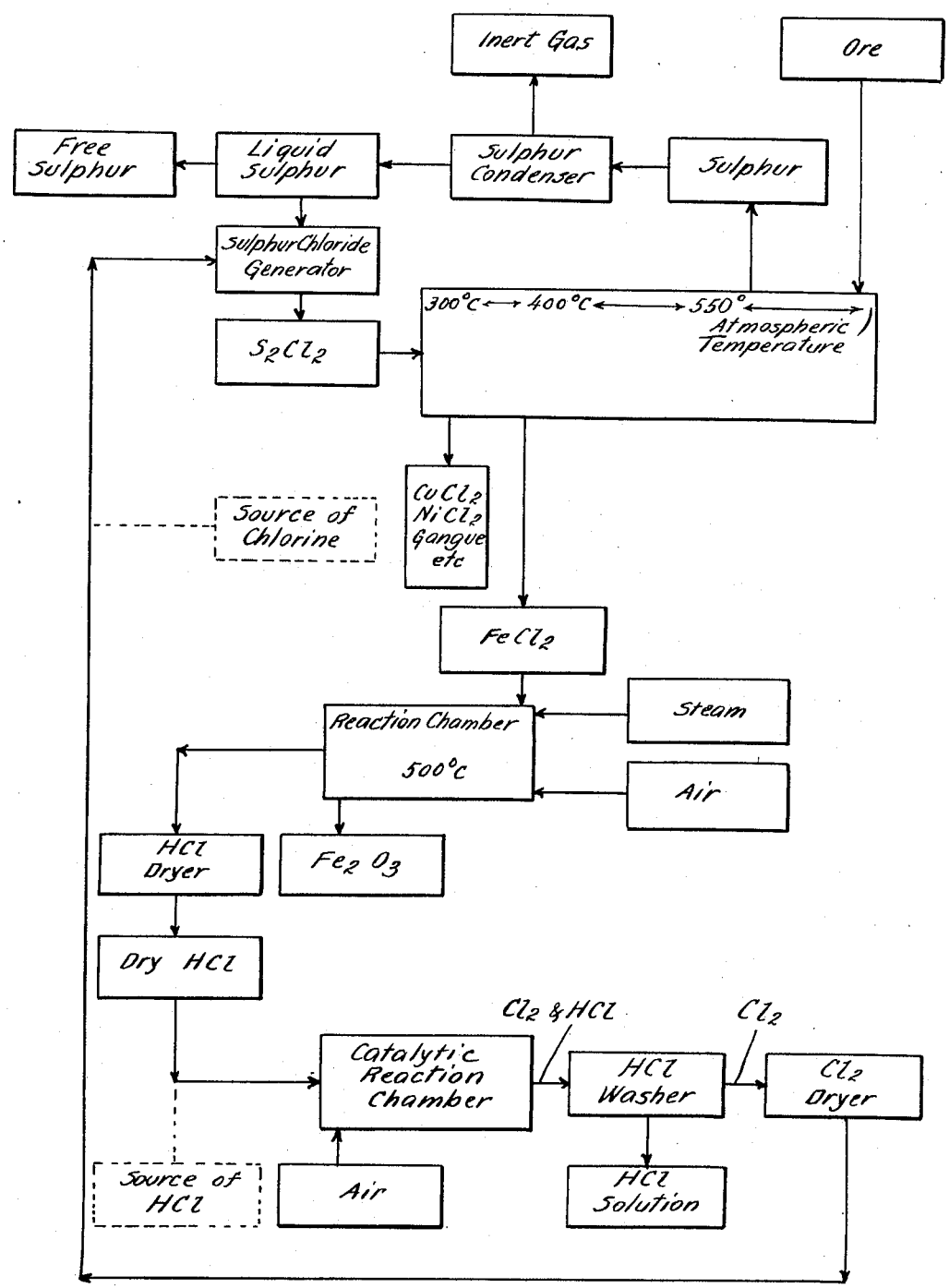

1,917,227

UNITED STATES PATENT OFFICE

RAYMOND F. BACON, OF BRONXVILLE, AND ISAAC BENCOWITZ, OF NEW YORK, N. Y.; SAID BENCOWITZ ASSIGNOR TO SAID BACON

RECOVERY OF SULPHUR

Application filed February 26, 1930. Serial No. 431,460.

This invention relates to the recovery of sulphur and has for an object the provision of an improved process for recovering sulphur from heavy metal sulphide ores. More particularly, the invention contemplates the provision of an improved process for recovering sulphur from materials containing one or more sulphides of iron. The invention further contemplates the provision of an improved process for treating heavy metal sulphide ores such, for example, as ore containing sulphides of iron, copper and nickel.

The process of the present invention involves the treatment of ore or other metallurgical raw materials or products containing pyrites or other sulphides of iron, alone or in combination with sulphides of other heavy metals, such for example, as copper and nickel, with sulphur chloride for the purpose of obtaining free sulphur and/or separating iron from the mass of material undergoing treatment.

In carrying out a process in accordance with the present invention, a quantity of the material to be treated is subjected to the action of sulphur chloride under such conditions that free sulphur and ferric chloride are produced and vaporized. The vaporized sulphur is collected and the ferric chloride is utilized for treating additional quantities of sulphide-bearing material to produce a product in which ferrous chloride is concentrated. The ferrous chloride concentrate is subjected to the action of steam and air at an elevated temperature to produce hydrogen chloride which is heated to recover chlorine. The chlorine recovered is returned to the process.

The process may be conveniently conducted by passing the sulphide-bearing material progressively through reaction zones of different temperatures. According to the preferred process of the invention, the iron sulphide-bearing material is first introduced into a reaction zone of relatively high temperature and passed progressively through reaction zones of lower temperatures. The process is so controlled that ferrous chloride is produced in the high temperature reaction zones and ferric chloride is produced in the lower temperature reaction zones. Elemental sulphur is produced and vaporized and the ferric chloride produced is vaporized. The vaporized sulphur and ferric chloride are caused to pass over fresh or partially converted sulphide-bearing material in the higher temperature reaction zones, the sulphur vapor ultimately being collected as free sulphur, and the ferric chloride reacting with sulphide compounds and being reduced to ferrous chloride.

The ferrous chloride concentrate is subjected to the action of air and steam to produce hydrogen chloride. The hydrogen chloride produced is dried and subjected to the action of air in the presence of a suitable catalyst to produce free chlorine which is returned to the process.

The chlorination process may be carried out in any suitable type of apparatus, but it is preferably carried out in a rotary reaction chamber in which a suitable temperature gradient is maintained and into which the sulphur chloride and iron sulphide-bearing material are introduced at appropriate points.

The invention will be better understood from a consideration of the accompanying flowsheet and the following description of a process involving the treatment of ore containing pyrites and sulphides of copper and nickel.

The ore to be treated is introduced in a dry, finely divided condition into the interior of a rotary reaction chamber having charging means at one end and discharging means at the other end. An opening or passage to permit the outward passage of sulphur vapors and other gases is provided near the charging end. The temperature within the reaction chamber is so regulated that it gradually increases from the normal atmospheric temperature at the charging end to a maximum temperature of about 550° C. at a point about midway between the two ends, and gradually decreases from the region of maximum temperature to about 300° C. at the discharge end. The opening or passage for sulphur vapors is preferably located at a point between the charging end of the chamber and the region of maximum temperature where the temperature within the chamber is about 450° C. or slightly lower.

The ore, preferably ground to provide particles sufficiently small to pass a 100-mesh screen in order that intimate contact of the sulphur chloride with the sulphide compounds may be obtained, is introduced into the reaction chamber at the charging end. Sulphur chloride is introduced into the reaction chamber at the discharge end. The sulphur chloride may be introduced into the reaction chamber as a liquid or as a gas. Liquid sulphur chloride will be vaporized immediately after its introduction.

The chlorination process is conducted as a batch process, the discharge end of the chamber being closed. The ore may be fed to the chamber continuously until the desired concentration has been effected, or the ore may be fed to the reaction chamber until a predetermined amount has been introduced.

When ore is first introduced into the reaction chamber, no sulphur chloride is introduced until the ore reaches or passes the zone of maximum temperature. As the ore reaches the zone of maximum temperature, the sulphur chloride may be admitted, slowly at first, and in gradually increasing amounts as the ore and chlorinated material progress through the chamber. Sulphur chloride may be admitted at any desired maximum rate. The rate at which sulphur chloride is admitted and the amount of sulphur chloride admitted will be determined by the rate of feeding of ore into the reaction zones and the amount of ore to be treated.

During the course of the process, the sulphur chloride first reacts with the sulphides of iron, copper and nickel to produce free sulphur, ferrous chloride and the chlorides of copper and nickel. The free sulphur is vaporized and passes out of the reaction chamber to suitable collecting and condensing apparatus. As the reaction chamber is rotated, the ferrous chloride-bearing material moves gradually toward the discharge end and fresh ore is moved into the zone of maximum temperature. As the ferrous chloride-bearing material moves toward the discharge end the sulphur chloride reacts with the ferrous chloride and oxidizes it to ferric chloride. The ferric chloride produced is vaporized and the resulting vapor is swept along with the sulphur chloride toward the zone of maximum temperature. The ferric chloride comes into contact with fresh or partially chlorinated sulphide-bearing material and is reduced to ferrous chloride.

The chlorination process is so conducted and controlled that iron compounds are substantially completely eliminated from the material in the discharge end portion of the reaction chamber and ferrous chloride is concentrated in the adjoining portion of the reaction chamber. The material in the discharge end portion of the reaction chamber will consist substantially entirely of nickel and copper chlorides and gangue materials which may be present in the original ore.

When the ore is fed continuously during the course of a process, the admission of ore and sulphur chloride may be discontinued when the presence of considerable ferric chloride in the issuing sulphur vapor indicates that insufficient fresh ore is being moved into the reaction zones to react with the ferric chloride produced, or when the operations have been conducted for a predetermined length of time.

When the ore is fed to the reaction chamber only until a predetermined amount has been admitted, the admission of sulphur chloride may be discontinued when the last portion of the ore reaches the zone of maximum temperature. The process may be so conducted that satisfactory concentration will have been effected at that time.

In the case of continuous feeding, at the completion of the chlorination treatment, the iron-free material containing chlorides of copper and nickel will be segregated in the discharge end portion of the chamber, fresh or substantially unaltered ore will be present in the portion of the reaction chamber between the charging end and the zone of maximum temperature, and the ferrous chloride-bearing material will be concentrated in the intermediate portion of the reaction chamber.

Upon the completion of a chlorination process involving the admission of a predetermined amount of ore, the iron-free material will be segregated in the discharge end portion of the reaction chamber, and the ferrous chloride-bearing material will be concentrated in the adjoining portion of the chamber. The charging end portion of the chamber will be empty.

When the admission of sulphur chloride has been discontinued, the discharge end of the reaction chamber may be opened. Rotation of the reaction chamber will cause the contents to be discharged. The iron-free material containing chlorides of copper and nickel is discharged and collected first and while the iron-free material is being discharged the ferrous chloride concentrate is being moved toward the discharge end. After the iron-free material has been discharged and collected, the ferrous chloride concentrate is discharged and collected separately.

When the ferrous chloride concentrate has been discharged, treatment of a fresh batch of ore is commenced.

The ferrous chloride concentrate is treated with steam in order to produce hydrogen chloride and oxide of the iron by hydrolysis. Air is admitted with the steam in order to assist the reaction by oxidation of the iron.

The air and steam are preheated in order to assist in maintaining the mass at the desired reaction temperature.

The hydrolysis will take place at normal atmospheric temperatures, but the rate of reaction is too slow for practical purposes. Higher temperatures not only increase the speed of the hydrolysis but also assist in the air oxidation which takes place. The treatment of the ferrous chloride concentrate with air and steam may be carried out satisfactorily at a temperature of from 440° C. to 600° C. Ordinarily, a reaction temperature of about 500° C. is entirely satisfactory.

The treatment of the ferrous chloride concentrate with air and steam may be carried out conveniently in a rotary reaction chamber having charging means at one end and discharging means at the opposite end and which is so constructed and arranged that the material passes from the charging end to the discharge end during its rotation. The ferrous chloride concentrate and the air and steam are introduced into the reaction chamber at the charging end and the resulting ferric oxide and hydrogen chloride are removed from the reaction chamber at the discharge end. The ferric oxide and hydrogen chlorides are preferably removed through separate discharge outlets. If the hydrogen chloride gas leaving the chamber carries considerable amounts of entrained particles of ferric oxide it may be desirable to provide a settling chamber into which the ferric oxide and hydrogen chloride may be introduced from the reaction chamber. Such a chamber should be maintained at a sufficiently high temperature to prevent the reverse reaction.

Means such, for example, as porcelain balls or other large pieces of inert materials are provided within the reaction chamber to prevent the ferrous chloride from adhering to the walls of the chamber. Such means aid in stirring and grinding the ferrous chloride and ferric oxide as they pass through the reaction chamber.

The gases issuing from the reaction chamber contain hydrogen chloride and water vapor and they are passed through a suitable drying apparatus, such, for example, as a packed tower having sulphuric acid trickling therethrough to separate the water vapor and produce dry hydrogen chloride.

The dry hydrogen chloride is introduced into a catalytic reaction chamber with one to seven times its volume of air, depending on the concentration of the hydrogen chloride available. The air is preheated to a temperature above 420° C. and preferably to a temperature between 520° C. and 530° C. If desired, the hydrogen chloride may also be preheated. Sufficient excess air to provide the necessary oxygen for combining with the hydrogen chloride in the catalytic reaction chamber may be introduced into the reaction chamber in which the ferrous chloride concentrate is treated for the production of hydrogen chloride. The excess air will pass through the system and enter the catalytic reaction chamber with the hydrogen chloride.

The catalytic reaction chamber preferably consists of a tower, or a series of communicating towers packed with a material having a very large surface per unit of volume such, for example, as pumice, brick, cinders and the like. The packing material should be of such a nature that it will be inert to the reagents and the products of the reaction. The packing material is covered or impregnated with the catalyst which may be one or more chlorides or sulphates of metals such, for example, as copper and nickel. The salts may be applied as such directly to the packing material or they may be formed in place as, for example, by the action of hydrogen chloride on copper oxide which is distributed throughout the mass. Means are provided for renewing the catalytic mass as its efficiency becomes reduced. For this purpose two towers or two series of communicating towers which may be used alternately are preferably provided.

A portion of the iron-free materials produced may be utilized as a catalytic mass or for providing a solution of copper chloride for impregnating a porous mass to be used in the catalytic chamber.

The apparatus is preferably so constructed that the mass of catalyst-bearing material may be maintained at a temperature of from 370° C. to 400° C. The reaction between the hydrogen chloride and the oxygen of the air is exothermic and it may be so controlled as to permit the proper temperature to be maintained. The reaction will proceed at temperatures as low as 205° C., and temperatures as high as 470° C. may be used advantageously. The temperature at which the reaction is conducted will be governed largely by the nature of the catalyst. The temperature employed should be sufficiently low that excessive volatilization of the catalyst is avoided. The reaction involved in this operation does not proceed to completion. The gases issuing from the reaction chamber will consist of a mixture of hydrogen chloride, water vapor and chlorine.

In view of the fact that the reaction does not readily proceed to completion, it may be desirable to retreat the issuing gases by subjecting them to a drying operation to remove the water vapor and subsequently passing them through a second reaction chamber. This procedure may be repeated two or three or more times if desired. In carrying out the reaction between hydrogen chloride and the oxygen of air it is advisable to carefully control the proportions of air and hydrogen chloride utilized in order to avoid excessive dilution of the resulting chlorine gas.

The gases containing hydrogen chloride and chlorine are washed with water to separate the chlorine and hydrogen chloride. The resulting solution of hydrogen chloride in water may be treated in any suitable manner to recover the hydrogen chloride.

The chlorine recovered is passed through a bath of molten sulphur which has been obtained by condensing a portion of the sulphur vapor recovered during the treatment of the sulphide-bearing material with sulphur chloride. The sulphur bath is maintained at a temperature above the boiling point of sulphur chloride and the sulphur chloride distills off as formed. The reaction between sulphur and chlorine will proceed at a temperature below the boiling point of sulphur chloride, but it is advantageous to conduct the reaction at a temperature above the boiling point of sulphur chloride in order to effect the immediate removal of the sulphur chloride from the reaction zone. The sulphur chloride vapor may be condensed to permit the escape of inert gases which enter the system during the admission of air. If desired, the inert gases may be conducted through a tower of solid sulphur in order to scrub out any sulphur chloride vapors contained therein. The sulphur chloride produced is utilized for treating the fresh batch of ore.

Inert gases, such as nitrogen, which are introduced into the system during the treatment of the ferrous chloride concentrate with air may also be eliminated when the free sulphur produced is condensed.

A source of fresh chlorine is provided to compensate for losses due to leakage and the formation of nickel and copper chlorides.

The iron-free material may be treated in any suitable manner to recover the nickel and copper.

We claim:

1. The method of treating iron sulphide-bearing material which comprises subjecting one portion of the material to the action of sulphur chloride to convert the iron to ferric chloride which is vaporized, contacting the ferric chloride with another portion of the material to obtain a ferrous chloride concentrate, collecting the elemental sulphur produced in the reactions, subjecting the ferrous chloride concentrate to the action of steam and air to produce hydrogen chloride, treating the hydrogen chloride to recover chlorine, combining the chlorine with a portion of the sulphur to reconstitute sulphur chloride, and returning the sulphur chloride thus recovered to the process.

2. The method of treating iron sulphide-bearing material which comprises subjecting the material to the action of sulphur chloride at a relatively high temperature to produce ferrous chloride, subjecting the ferrous chloride to the action of the sulphur chloride at a relatively low temperature to produce and vaporize ferric chloride, subjecting the ferrous sulphide-bearing material to the action of the ferric chloride vapor to obtain a ferrous chloride concentrate, collecting the elemental sulphur produced in the reactions, treating the ferrous chloride concentrate to produce hydrogen chloride, treating the hydrogen chloride to recover chlorine, combining the chlorine with a portion of the sulphur to reconstitute sulphur chloride, and returning the sulphur chloride thus recovered to the process.

3. The method of treating iron sulphide-bearing material which comprises subjecting one portion of the material in a reaction chamber to the action of sulphur chloride to convert the iron to ferric chloride, vaporizing said ferric chloride, contacting said ferric chloride with another portion of said material to chlorinate the same and produce a ferrous chloride concentrate, collecting the elemental sulphur produced in the reactions, subjecting the ferrous chloride concentrate to the action of steam and air at an elevated temperature to produce hydrogen chloride, treating the hydrogen chloride to recover chlorine, combining the chlorine with a portion of the sulphur to reconstitute sulphur chloride, and returning the sulphur chloride thus recovered to the process.

4. The method of treating iron sulphide-bearing material which comprises subjecting one portion of the material in a reaction chamber to the action of sulphur chloride to convert the iron to ferric chloride, vaporizing said ferric chloride, contacting said ferric chloride with another portion of said material to chlorinate the same and produce a ferrous chloride concentrate, collecting the elemental sulphur produced in the reactions, treating the ferrous chloride concentrate to produce hydrogen chloride, treating the hydrogen chloride to recover chlorine, combining the chlorine with a portion of the sulphur to reconstitute sulphur chloride, and returning the sulphur chloride thus recovered to the process.

5. The method of treating material containing sulphides of iron, copper and nickel which comprises subjecting one portion of the material in a reaction chamber to the action of sulphur chloride to convert the iron to ferric chloride and the copper and nickel to copper and nickel chlorides, volatilizing said ferric chloride to obtain a product consisting of copper and nickel chlorides substantially free of iron, contacting said ferric chloride with another portion of said material to convert the iron to ferrous chloride and produce a ferrous chloride concentrate, collecting the elemental sulphur produced in the reactions, treating the ferrous chloride concentrate to form hydrogen chloride, subjecting the hydrogen chloride to the action of oxygen in the presence of a portion of the iron-free product to recover chlorine, combining the chlorine with a portion of the sulphur to reconstitute sulphur chloride, and returning the sulphur chloride thus recovered to the process.

6. The method of treating iron sulphide-bearing material which comprises subjecting one portion of the material to the action of sulphur chloride to convert the iron sulphide to ferric chloride, volatilizing said ferric chloride whereby a substantially iron-free product is obtained, contacting said ferric chloride with another portion of said material to chlorinate the same and produce a ferrous chloride concentrate, collecting the elemental sulphur produced in the reactions, subjecting the ferrous chloride concentrate to the action of steam and air to produce hydrogen chloride, subjecting the hydrogen chloride to the action of oxygen to recover chlorine, combining the chlorine with a portion of the sulphur to reconstitute sulphur chloride, and returning the sulphur chloride thus recovered to the process.

In testimony whereof we affix our signatures.

RAYMOND F. BACON.
ISAAC BENCOWITZ.